(12) United States Patent
Roquemore et al.

(10) Patent No.: US 6,811,293 B1
(45) Date of Patent: Nov. 2, 2004

(54) MIXER-KNEADER FOR DOUGH MAKING

(75) Inventors: William M. Roquemore, Dayton, OH (US); Peter A. Dreher, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 72 days.

(21) Appl. No.: 10/153,196

(22) Filed: May 22, 2002

Related U.S. Application Data

(60) Provisional application No. 60/292,656, filed on May 22, 2001.

(51) Int. Cl.[7] ............................................. A21C 1/08
(52) U.S. Cl. ...................... 366/74; 366/76.6; 366/153.2
(58) Field of Search .......................... 366/76.1–76.93, 366/72, 74, 153.2, 153.3; 100/210, 156; 425/201

(56) References Cited

U.S. PATENT DOCUMENTS

| | | | |
|---|---|---|---|
| 3,681,485 A | * 8/1972 | Lieberman | 264/46.3 |
| 3,929,319 A | * 12/1975 | Willemsen | 366/76.3 |
| 4,023,776 A | * 5/1977 | Greten | 366/153.2 |
| 4,352,567 A | * 10/1982 | Guibert | 366/76.2 |
| 4,490,046 A | 12/1984 | Guibert | |
| 4,869,661 A | * 9/1989 | Vinas I Nogueroles | 425/371 |
| 5,310,569 A | 5/1994 | Muller | |
| 5,556,198 A | 9/1996 | Dickson, Jr. et al. | |
| 5,804,225 A | * 9/1998 | Hayashi | 425/363 |
| 5,839,356 A | 11/1998 | Dornbush et al. | |

FOREIGN PATENT DOCUMENTS

| | | | |
|---|---|---|---|
| EP | 2114397 A1 | * | 5/1998 |
| JP | 9-253471 | * | 9/1997 |

* cited by examiner

*Primary Examiner*—Charles E. Cooley
(74) *Attorney, Agent, or Firm*—Bobby D. Scearce; Thomas L. Kundert

(57) ABSTRACT

A low power consuming dough-making machine is provided that includes sources of liquid and dry ingredients for the dough, a movable conveyor for receiving thereon layers of liquid and dry ingredients from the sources thereof to form a cake of ingredients of the desired dough composition, and a plurality of high speed rollers for kneading the cake of ingredients to the desired consistency for the dough product.

2 Claims, 1 Drawing Sheet

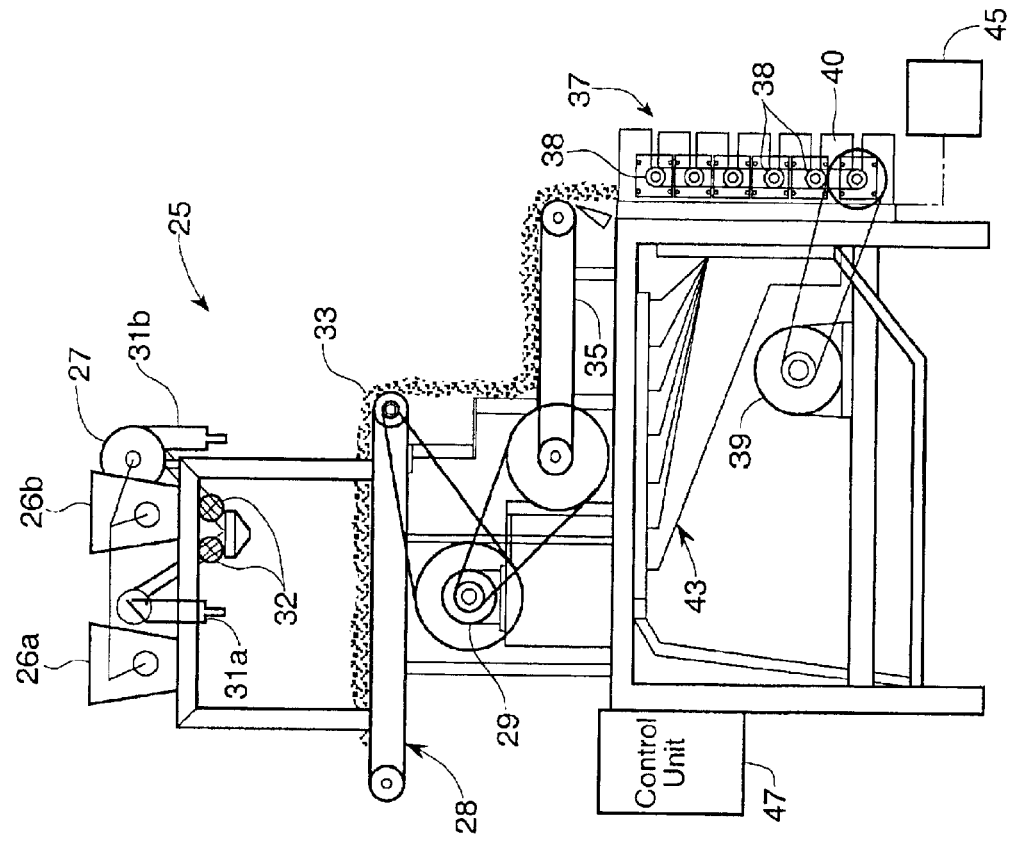
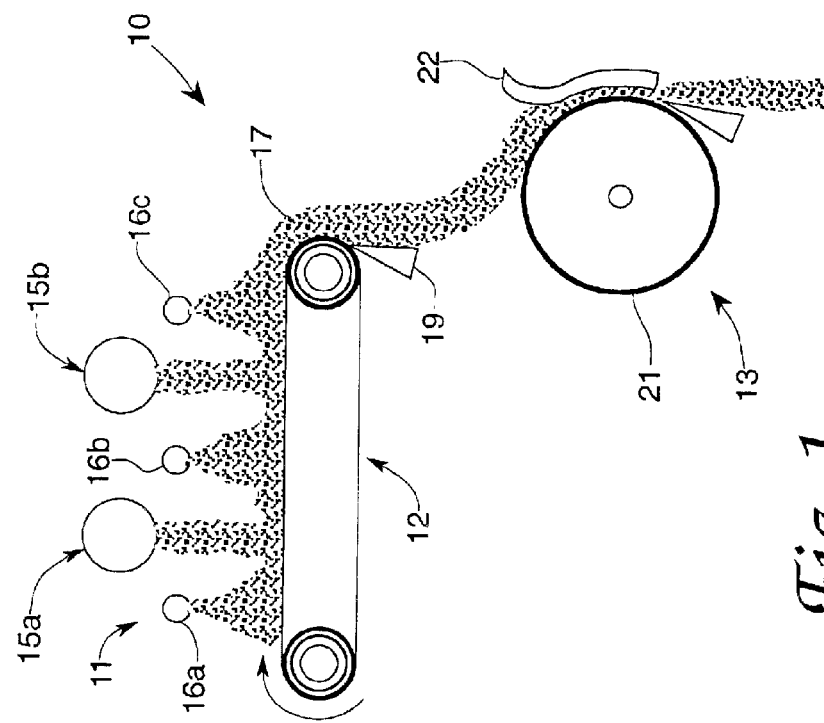

MIXER-KNEADER FOR DOUGH MAKING

CROSS-REFERENCE TO RELATED APPLICATION

This application claims priority of the filing date of Provisional Application Ser. No. 60/292,656 filed 22 May 2001, the entire contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to food processing machines, and more particularly to an improved machine for mixing and kneading dough in the preparation of bread or the like.

Industrial sized dough-making machines heretofore used for preparing dough for commercial bread making are generally large batch type machines. Typically, the machines prepare dough in batches of a few thousands of pounds and consume large amounts of energy to perform the required mixing and kneading process on the dough. In so doing, the machine often causes the dough to over-heat unless the machine is equipped with a cooling system to maintain the dough at a desired temperature and prevent fermentation of any yeast content within the dough. The cooling system for the machine also consumes significant amounts of energy. Batch machines typically may require about one-half hour to mix the ingredients and develop gluten within the dough and therefore does little more than mimic mixing and kneading by hand. By reason of its large size, the presently used batch machine is awkward, labor intensive and therefore expensive to operate, to clean and to maintain, and quality of the product is only checked and maintained on the basis of the very large batch size for which the batch machine operates.

Background information related to automatic bread making machines and appliances for kneading dough may be found in U.S. Pat. No. 5,839,356 to Dornbush et al and U.S. Pat. No. 5,556,198 to Dickson, Jr. et al and the references cited therein, the contents of all of which are incorporated by reference herein.

Relevant prior art dough making systems and methods include a method for producing dough disclosed in U.S. Pat. No. 5,310,569 to Muller wherein dry ingredients are measured and mixed on a continuous basis and liquid ingredients are injected into the dry ingredient stream. The ingredients are then transferred to a temperature controlled kneading chamber that generates a continuous stream of dough. The dough stream is discharged from the kneading chamber without benefit of rollers or stress inducing apparatus through a discharge conduit of predetermined flow resistance.

In U.S. Pat. No. 4,490,046 to Guibert an automatic dough producing system is disclosed having a controllable mixing stage into which are fed flour and a dough-forming solution to produce a paste that is then supplied to a development stage yielding dough. In the development stage, the incoming paste is fed through a lateral inlet to a screw rotating within an elongated tube at a variable speed, the inlet position being adjustable along the screw to vary the length of that portion of the screw which acts to knead and develop the paste to produce the dough.

The invention described herein solves or substantially reduces in critical importance shortcomings with previously existing dough making machines and systems as suggested in the foregoing discussion by providing an automatic mixer-kneader machine for dough making that includes a moving endless conveyor belt supported by a pair of rollers and powered by a motor, the belt disposed for receiving dry ingredients for the dough from one or more powder sifters and liquid ingredients from one or more liquid sprays in order to form a cake of the liquid and dry ingredients on the moving belt, means for stripping the cake from the belt and transferring the cake to one or more high speed rollers for kneading the cake into a gluten developed layer of dough for forming into loaves. The machine described by the invention is intended for substantially continuous operation utilizing a fraction of the power required by conventional dough making systems.

It is a principal object of the invention to provide an improved food-processing machine.

It is another principal object of the invention to provide an improved machine for mixing and kneading dough in the preparation of bread type foods.

It is another object of the invention to provide a machine for continuous mixing and kneading of dough for preparation of bread foods.

It is another object of the invention to provide a machine for mixing and kneading dough that has minimal in-process inventory associated with its operation.

It is a further object of the invention to provide a machine for mixing and kneading dough that has low power requirements for operation.

It is a further object of the invention to provide a machine for mixing and kneading dough that is characterized by improved in-process quality control of the dough product as compared to prior art machines.

It is a further object of the invention to provide a machine for mixing and kneading dough that is inexpensive to operate and maintain.

It is another object of the invention to provide a machine for mixing and kneading dough that has minimal cooling requirements associated with its operation.

These and other objects of the invention will become apparent as a detailed description of representative embodiments proceeds.

SUMMARY OF THE INVENTION

In accordance with the foregoing principles and objects of the invention, a low power consuming dough-making machine is provided that includes sources of liquid and dry ingredients for the dough, a movable conveyor system for receiving thereon layers of liquid and dry ingredients from the sources thereof to form a cake of ingredients of the desired dough composition, and a plurality of high speed rollers for kneading the cake of ingredients to the desired consistency for the dough product.

DESCRIPTION OF THE DRAWINGS

The invention will be more clearly understood from the following detailed description of representative embodiments thereof read in conjunction with the accompanying drawings wherein:

FIG. 1 is a schematic side elevational view of the essential components of the dough-making machine of the invention illustrating the principles of operation thereof; and FIG. 2 is a schematic side elevational view of a representative embodiment of the invention built and operated in demonstration of the invention.

DETAILED DESCRIPTION

Referring now to the drawings, FIG. 1 shows a conceptual side elevational schematic of a representative embodiment of the invention presented herein primarily for the purposes of showing all the essential components of the dough-making machine of the invention and of illustrating the fundamental principles of operation of the invention. In FIG. 1 it is seen that dough-making machine 10 comprises three major cooperating component functional parts or stages, including a source stage 11 of ingredients for the dough, and a conveyor system 12 for receiving and supporting the various ingredients and moving the ingredients to the kneading stage 13 where the dough is kneaded and fully gluten developed for division into portions (e.g., loaves) and subsequent baking as a bread product. Source stage 11 includes one or more sources of dry ingredients 15a,b for supplying flour, baking powders, seasonings and other dry ingredients customarily used and well known in the art of dough making and bread baking, the nature, constituency and respective compositions of which may be selectable by one skilled in the applicable art in the practice of the invention for a particular application and are therefore not considered limiting of the scope of the invention as defined in the appended claims. Further, the dry ingredients are preferably premixed in one or more of the sources 15a,b as would occur to the skilled artisan in order to facilitate the dough making process. Sources 15 may be in any conventional form for supplying the dry ingredients in selected measured quantities and rates to the conveyor means as suggested in FIG. 1 and may include devices such as auger powder sifters, pin-wheel feeders, roller feeders, or the like, as would occur to the skilled artisan practicing the invention. Correspondingly, liquid ingredients may be supplied through one or more liquid sprayers 16a,b,c for uniformly applying the liquid ingredients onto the dry ingredients in selected measured quantities and flow rates in order to provide a cake 17 of the desired composition of liquid and dry ingredients on moving conveyor means 12 also as suggested in FIG. 1. Sources 16 may be in any conventional form for supplying the liquid ingredients such as conventional spray bars, fan spray nozzles, drip bars, or cone spray nozzles, as would occur to the skilled artisan practicing the invention, and the liquid ingredients may preferably be applied in premixed form.

In the operation of machine 10, the dry ingredients are applied to the conveyor means 12 and sprayed with the liquid ingredients in predetermined measured quantities and rates to form the cake 17 as described above. The cake 17 is transported on conveyor 12 and separated from conveyor 12 by a blade, scraper or equivalent means such as depicted in FIG. 1 as doctor blade 19, considered herein as any form of blade or edge structure useful for scraping the dough cake from a roller or conveyer. The cake 17 so separated from conveyor 12 consists essentially of dough of the selected composition in the un-kneaded form. The un-kneaded cake 17 so separated from conveyor 12 is allowed to enter kneading stage 13, which comprises a plurality of high speed rollers 21 in closely spaced relationship to nip plate 22. Plate 22 comprises a solid surface near rollers 21 between which cake 17 is sheared and kneaded to the desired consistency. In the demonstration unit discussed more fully below, plate 22 comprised one-half inch thick 304 stainless steel ground to a uniform surface flat to within 0.001 inch. Rollers 21 were mounted near plate 22 providing a gap of selected width between the outer surface of the rollers 21 and plate 22. The gap for the uppermost roller was set at 0.002 inch as corresponding to the diameter of the undeveloped gluten ball or particle within cake 17. The remaining rollers had progressively larger gaps. Cake 17 exits stage 13 as fully kneaded and gluten developed dough product. Gluten is a long string protein fiber, wadded into a tiny ball inside a wheat kernel or flour particle. Wetting and shearing of the gluten ball helps to unravel the gluten into along fiber. The long fibers entangle with each other, which provides some strength and toughness to the fully kneaded dough. As a fiber unravels and further separates within stage 13, it needs a progressively wider gap to pull at the respective ends of the fiber. The intensity of shear need not be so great as to fully stretch the fiber so that the energy requirement for operating the rollers within stage 13 is minimized, and the larger gap maximizes volume throughput of dough through stage 13 for a given roller speed. Adjustable gaps are a characteristic of a preferred embodiment of the invention in that a small gap is best for undeveloped dough, but progressively larger gaps near each successive roller provide optimal dough development as the dough passes though stage 13. Once the dough is fully gluten developed and kneaded, it may be subsequently divided into loaf portions of selected size for further baking into a bread-type product.

Referring now to FIG. 2 of the drawings, shown therein is a schematic side elevational view of a representative embodiment of the a dough making machine 25 according to the invention that was built and operated in demonstration of the invention. Machine 25 was designed and configured to provide about 1,600 lbs per hour of dough, although the dough making capacity of the machine is not considered a limitation on the invention as described and claimed herein. In demonstration machine 25, a pair of sifter hoppers 26a,b controlled by conventional variable speed motor means 27 apply thin layers of dry ingredients onto movable first conveyor 28 operatively controlled by a variable speed conveyor motor 29. Conveyor 28 may be operated at up to abut 100 feet per minute (fpm), and typically about 60 fpm. Flow rates for dry ingredients onto conveyor 28 are selectable depending on the type and composition of dough and eventual bread product being made, and may be of the order of up to about 100 cubic feet per hour (cfh) in order to result in the desired thin layer of ingredients comprising cake 33. Spray nozzles 31a,b controlled by metering valves 32 apply alternate layers of liquid ingredients to the moving dry ingredient layers on conveyor 28 in order to form cake 33 of the desired composition of dry and liquid ingredients. The liquid ingredients are preferably applied as a fine mist in order to avoid balling up the dry ingredients on conveyor 28. Liquid flow rates also depend on the intended dough composition, and may be up to about 100 gallons per hour (gph). Cake 33 thickness on conveyor 28 is typically intended to be thin, about $\frac{1}{15}$ inch, to facilitate blending of the liquid and dry ingredients, and cake width is typically about one foot. A first thin film layer of liquid ingredients may preferably be applied on conveyor 28 prior to the application of dry ingredients in order to facilitate diffusion together of the liquid and dry ingredients within cake 33. As suggested in FIG. 2, cake 33 is then transferred to a second conveyor 35 by any suitable means such as gravity drop, doctor blade or a nip contact. Conveyor 28 may be tilted slightly downwardly in order to assist release of cake 33 to conveyor 35. Conveyor 35, also controlled by variable speed motor 29, is geared to move at a higher rate than conveyor 28. Residence times of the dough cake 33 on each conveyor 28,35 may be selected depending on the type of dough being prepared by judicious selection of conveyor length and speed of operation. Conveyor 35 may be run at a substantially lower speed (such as up to about 5 fpm) to allow the accumulation of cake 33 depth thereon of about two or more inches and to allow up to several minutes of soaking (residence) time for the wet dough cake 33 thereon before kneading, and at the same time allow the application of very thin layers of dry and liquid ingredients onto conveyor 28 for quick diffusion together of the liquid ingredients and dry ingredients. Accordingly, belt lengths on each of conveyors 28,35 are minimized as is the overall size of the machine 25. Commercially obtainable conveyor belts usable in the invention may have widths nominally about 18 to 24 inches, and, in the demonstration machine 25, each conveyor 28,35 was about seven feet long, length and width of the conveyors, however, not considered limiting of the invention. Both conveyors 28,35 preferably have slick non-adherent surfaces to facilitate separation of dough cake 33 therefrom. In the demonstration unit, each conveyor belt comprised slippery urethane rubber, although other materials, as would occur to the skilled artisan practicing the invention, such as fiber or fabric reinforced rubber, PVC rubber, latex or silicone rubber, fabric or metal sheet with or without coatings such as TEFLON or other materials suitable for the purpose may be useful, material selection also not considered limiting of the invention herein.

Cake 33 is then separated from conveyor 35 and passed into kneading stage 37 comprising a plurality of high speed rollers 38 controlled by a variable speed motor 39. Conveyor 35 may also be tilted downwardly to assist separation of cake 33 therefrom. Rollers 38 are disposed in closely spaced relationship (a few thousandths of an inch) with shear or nip plate 40 so that the desired kneading action is accomplished between the rollers and the plate. Rollers 38 may be water cooled as at 43 in order to conduct away any heat generated by the kneading action of the dough within kneading stage 37. Rollers 38 may have roughened surfaces and may preferably be run at high speed to facilitate both the kneading process and removal of dough from the rollers during the kneading process. Within kneading stage 37, the dough is rolled and stretched between the confronting surfaces of the rollers 38 and nip plate 40 to stretch and spread the gluten fibers within the dough over adjacent starch particles and gluten fibers thereby interlocking adjacent fibers and particles and increasing the strength and integrity of the dough product.

Auger 45 or similar device is disposed at the outlet of kneading stage 37 for moving the fully kneaded dough away from the kneading stage for further processing by division into portions for subsequent baking. Central control unit 47, which may be computer controlled, may be included for monitoring, controlling and coordinating all facets of operation of the machine.

The invention provides substantial advantages over prior art batch machines, in that the dough-making machine of the invention is relatively small and easy and inexpensive to operate, mixes ingredients and develops the gluten quickly with minimal energy use, may be easier to clean and to maintain than batch machines, has less in-process inventory than conventional batch machines, allows for instantaneous quality check, and requires minimal cooling because the kneading zone of the machine is thin and produces minimal viscous heating.

The entire contents of all references cited herein are incorporated by reference herein:

The invention therefore provides an improved machine for the continuous mixing and kneading of bread dough or the like. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. A dough making machine, comprising:
    (a) a source of dry ingredients and liquid ingredients for the dough;
    (b) a mixing stage comprising means for continuously mixing preselected measured quantities of said dry and liquid ingredients to continuously form a cake of the desired composition for said dough, wherein said mixing stage includes a moving conveyor for continuously receiving thereon measured quantities of said dry ingredients and said liquid ingredients whereby said cake of the desired composition for said dough is continuously formed on said moving conveyor, and wherein said source includes two or more powder mixers and two or more liquid sprayers for applying successive alternate layers of said dry and liquid ingredients onto said conveyor in order to facilitate the diffusion together of said dry and liquid ingredients into said cake; and
    (c) a kneading stage including a plurality of rollers disposed in selected spaced relationship from a surface for kneading said cake between said rollers and said surface into dough of a desired consistency.

2. The machine of claim 1 further comprising means for discharging said dough in selected quantities from said kneading stage for processing by baking into a bread-type product.

* * * * *